United States Patent
Shi

(10) Patent No.: US 11,604,134 B2
(45) Date of Patent: Mar. 14, 2023

(54) SHEATH FLOW IMPEDANCE PARTICLE ANALYZER AND MEASUREMENT METHOD THEREFOR

(71) Applicant: SHENZHEN MINDRAY BIO-MEDICAL ELECTRONICS CO., LTD., Shenzhen (CN)

(72) Inventor: Huilin Shi, Shenzhen (CN)

(73) Assignee: SHENZHEN MINDRAY BIO-MEDICAL ELECTRONICS CO., LTD., Shenzhen (CN)

(*) Notice: Subject to any disclaimer, the term of this patent is extended or adjusted under 35 U.S.C. 154(b) by 385 days.

(21) Appl. No.: 16/907,114

(22) Filed: Jun. 19, 2020

(65) Prior Publication Data
US 2020/0319078 A1    Oct. 8, 2020

Related U.S. Application Data

(63) Continuation of application No. PCT/CN2017/120374, filed on Dec. 30, 2017.

(51) Int. Cl.
G01N 15/14    (2006.01)
G01N 15/10    (2006.01)
B01F 33/30    (2022.01)

(52) U.S. Cl.
CPC ............ *G01N 15/14* (2013.01); *B01F 33/30* (2022.01); *G01N 15/1031* (2013.01); *G01N 2015/1409* (2013.01)

(58) Field of Classification Search
CPC .............. G01N 15/14; G01N 15/1031; G01N 2015/1409; G01N 2015/1006; B01F 33/30
(Continued)

(56) References Cited

U.S. PATENT DOCUMENTS 4,070,617 A * 1/1978 Kachel ............... G01N 15/1209
324/71.1
4,140,966 A * 2/1979 Godin ..................... G01N 15/12
324/71.1
(Continued)

FOREIGN PATENT DOCUMENTS

CN    101965517 A    2/2011
CN    102533536 A    7/2012
(Continued)

OTHER PUBLICATIONS

International Search Report issued in corresponding International Application No. PCT/CN2017/120374, dated Sep. 26, 2018, 5 pages.

*Primary Examiner* — Christopher P Mcandrew
(74) *Attorney, Agent, or Firm* — Kory D. Christensen

(57) ABSTRACT

A sheath flow impedance particle analyzer includes a pre-mixing cell, a sample needle, a sheath flow impedance counting cell, a front sheath fluid cell, a rear sheath fluid cell, a rear sheath waste fluid cell, a waste fluid cell, and a first auxiliary negative pressure source. The first auxiliary negative pressure source includes at least one low pressure port, and a valve for controlling the low pressure port to open or close, the low pressure port being connected to the sample needle or the rear sheath waste fluid cell. During measurement of a sample by the sheath flow impedance counting cell, at least the negative pressure of the first auxiliary negative pressure source enables the sample needle to transfer a sample liquid or enable the rear sheath waste fluid cell to discharge a waste fluid.

20 Claims, 3 Drawing Sheets

(58) Field of Classification Search
USPC .................................................... 422/82.01
See application file for complete search history.

(56) References Cited

U.S. PATENT DOCUMENTS

| | | | | |
|---|---|---|---|---|
| 4,198,160 | A * | 4/1980 | Kachel | G01N 15/12 |
| | | | | 324/71.4 |
| 4,710,021 | A * | 12/1987 | von Behrens | G01N 15/1245 |
| | | | | 356/73 |
| 5,173,740 | A | 12/1992 | Fukuda et al. | |
| 5,182,617 | A | 1/1993 | Yoneyama et al. | |
| 5,691,633 | A * | 11/1997 | Liu | G01N 15/12 |
| | | | | 324/71.1 |
| 5,719,666 | A * | 2/1998 | Fukuda | G01N 15/1456 |
| | | | | 356/73 |
| 5,905,214 | A * | 5/1999 | Inami | G01N 15/1404 |
| | | | | 73/866 |
| 6,909,269 | B2 * | 6/2005 | Nagai | G01N 15/1209 |
| | | | | 324/71.4 |
| 2008/0122423 | A1 * | 5/2008 | Luo | G01N 15/1209 |
| | | | | 324/71.4 |

FOREIGN PATENT DOCUMENTS

| | | | | |
|---|---|---|---|---|
| CN | 103575634 | A | 2/2014 | |
| CN | 204008405 | A | 12/2014 | |
| CN | 104749085 | A | 7/2015 | |
| CN | 101173887 | A | 5/2018 | |
| EP | 3196632 | A1 * | 7/2017 | ......... G01N 15/1031 |
| JP | H10260129 | A | 9/1998 | |

* cited by examiner

SHEATH FLOW IMPEDANCE PARTICLE ANALYZER AND MEASUREMENT METHOD THEREFOR

CROSS-REFERENCE TO RELATED APPLICATIONS

This application is a bypass continuation of Patent Cooperation Treaty Application No. PCT/CN2017/120374, filed on Dec. 30, 2017, the content thereof is hereby incorporated by reference in its entirety.

TECHNICAL FIELD

The present application relates to the technical field of particle analysis equipment, and in particular to a sheath flow impedance particle analyzer and a measurement method for a sheath flow impedance particle analyzer. The sheath flow impedance particle analyzer can use sheath flow impedance to measure and analyze the quantity, volume, and the like of particles.

BACKGROUND

An existing sheath flow impedance particle analyzer generally comprises a pre-mixing cell, a sample needle, a sheath flow impedance counting cell, a front sheath cell, a rear sheath cell, a rear sheath waste fluid cell, a waste fluid cell and other components. A measurement process of the sheath flow impedance particle analyzer is mainly as follows: cleaning the pre-mixing cell and discharging waste to the waste fluid cell, loading a sample into the pre-mixing cell and evenly mixing the sample, cleaning the sheath flow impedance counting cell and discharging waste to the waste fluid cell, preparing a sample with the sample needle, forming front and rear sheath fluids, sampling and measuring the sample, discharging a waste fluid from the rear sheath waste fluid cell, etc. The entire measurement process is finished in a sequential order. As a result, the particle analyzer using sheath flow impedance has a relatively long measurement cycle and a relatively slow measurement speed.

SUMMARY

The objective of the present application is to provide a sheath flow impedance particle analyzer and a measurement method therefor that can shorten a measurement cycle and increase a measurement speed.

To resolve the foregoing technical problem, the present application provides a sheath flow impedance particle analyzer, comprising a pre-mixing cell, a sample needle, a sheath flow impedance counting cell, a front sheath fluid cell, a rear sheath fluid cell, a rear sheath waste fluid cell, and a waste fluid cell, wherein the pre-mixing cell is connected to the sample needle, and a valve is disposed between the pre-mixing cell and the sample needle; the sheath flow impedance counting cell comprises a front cell and a rear cell, and the sample needle is connected to the front cell; the front sheath fluid cell comprises a front sheath fluid inlet port in communication with the front cell, and the front sheath fluid cell supplies a front sheath fluid into the front cell through the front sheath fluid inlet port; the rear sheath fluid cell comprises a rear sheath fluid inlet port connected to the rear cell, and the rear sheath fluid cell supplies a rear sheath fluid into the rear cell through the rear sheath fluid inlet port; the rear sheath waste fluid cell comprises a sheath waste fluid inlet port in communication with the rear cell, and the rear sheath waste fluid cell is configured to collect a rear sheath waste fluid generated after the sheath flow impedance counting cell measures a sample fluid; the pre-mixing cell, the sample needle, the sheath flow impedance counting cell, and the rear sheath waste fluid cell are all connected to the waste fluid cell; the waste fluid cell is a main negative pressure source and is configured to receive waste fluids discharged from the pre-mixing cell, the sample needle, the sheath flow impedance counting cell, and the rear sheath waste fluid cell; and the sheath flow impedance particle analyzer further comprises a first auxiliary negative pressure source, the first auxiliary negative pressure source comprises at least one low pressure port and a first connecting port, the low pressure port is connected to the sample needle or the rear sheath waste fluid cell, and the first auxiliary negative pressure source is connected to the waste fluid cell by the first connecting port.

The present application further provides a measurement method for a sheath flow impedance particle analyzer, comprising the following steps:

providing a sheath flow impedance particle analyzer;

obtaining a sample fluid by reacting a blood sample and a reagent;

cleaning a sheath flow impedance counting cell;

transferring the sample fluid to a predetermined position;

pushing the sample fluid into a front cell of the sheath flow impedance counting cell with a syringe so that the sample fluid is surrounded by a sheath flow to enable the sheath flow impedance counting cell to measure the sample fluid; and discharging a waste fluid in a rear sheath waste fluid cell, wherein the step of transferring a sample fluid to a predetermined position or discharging a waste fluid in a rear sheath waste fluid cell is performed during measurement of the sample fluid by the sheath flow impedance counting cell. In the sheath flow impedance particle analyzer provided in the present application, during measurement of the sample fluid by the sheath flow impedance counting cell, at least one action of fluid discharge and cleaning of a pre-mixing cell, sample loading and even mixing in the pre-mixing cell, waste discharge of the rear sheath waste fluid cell, negative pressure pre-supplied in a buffering cell, and sample fluid sampling and transferring by a sample needle can be performed, so that the measurement cycle of the sheath flow impedance particle analyzer can be shortened, and the measurement speed is increased.

BRIEF DESCRIPTION OF THE DRAWINGS

In order to illustrate the technical solutions in the embodiments of the present application more clearly, a brief introduction to the drawings required for the implementations will be provided below. Obviously, the drawings in the following description are some of the implementations of the present application, and those of ordinary skill in the art can also obtain other drawings according to these drawings without involving any inventive effort.

DETAILED DESCRIPTION

The technical solutions of the embodiments of the present application will be described below clearly and comprehensively in conjunction with the drawings of the embodiments of the present application. Clearly, the embodiments described are merely some embodiments of the present application and are not all the possible embodiments. Based on the embodiments given in the present application, all other embodiments that would be obtained by those of ordinary skill in the art without expending inventive effort shall all fall within the scope of protection of the present application.

The "connection" discussed herein comprises direct connection and indirect connection by another member such as a valve.

Figure 1:
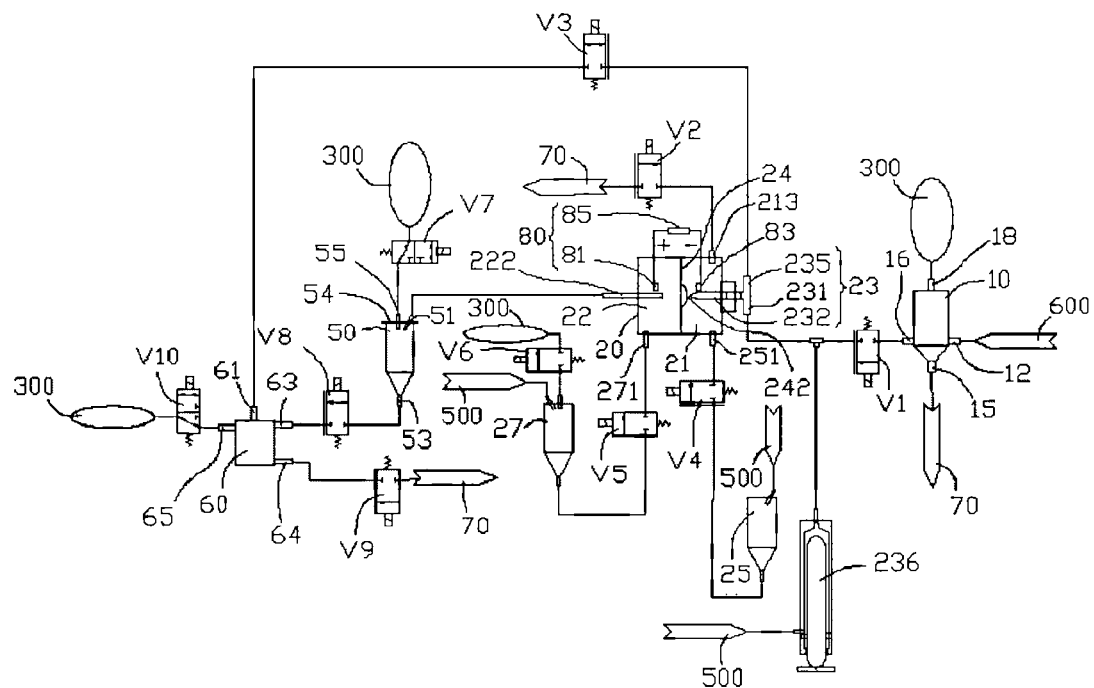
FIG. 1 is a schematic diagram of a fluid path and a measurement circuit of a first embodiment of a sheath flow impedance particle analyzer according to the present application.

Referring to FIG. 1, FIG. 1 is a schematic diagram of a fluid path and a measurement circuit of a first embodiment of a sheath flow impedance particle analyzer according to the present application. The present application provides a sheath flow impedance particle analyzer, comprising a pre-mixing cell 10, a sample needle 23, a sheath flow impedance counting cell 20, a front sheath fluid cell 25, a rear sheath fluid cell 27, a rear sheath waste fluid cell 50, and a waste fluid cell 70. The pre-mixing cell 10 is connected to the sample needle 23. A valve V1 is disposed between the pre-mixing cell 10 and the sample needle 23. The sheath flow impedance counting cell 20 comprises a front cell 21 and a rear cell 22. The sample needle 23 is connected to the front cell 21. The front sheath fluid cell 25 comprises a front sheath fluid inlet port 251 in communication with the front cell 21, and the front sheath fluid cell 25 supplies a front sheath fluid into the front cell 21 through the front sheath fluid inlet port 251. The rear sheath fluid cell 27 comprises a rear sheath fluid inlet port 271 connected to the rear cell 22, and the rear sheath fluid cell 27 supplies a rear sheath fluid into the rear cell 22 through the rear sheath fluid inlet port 271. The rear sheath waste fluid cell 50 comprises a sheath waste fluid inlet port 51 in communication with the rear cell 22. The rear sheath waste fluid cell 50 is configured to collect a rear sheath waste fluid generated after the sheath flow impedance counting cell 20 measures a sample fluid. The pre-mixing cell 10, the sample needle 23, the sheath flow impedance counting cell 20, and the rear sheath waste fluid cell 50 are all connected to the waste fluid cell 70. The waste fluid cell 70 is a main negative pressure source and is configured to receive waste fluids discharged from the pre-mixing cell 10, the sample needle 23, the sheath flow impedance counting cell 20, and the rear sheath waste fluid cell 50. The sheath flow impedance particle analyzer further comprises a first auxiliary negative pressure source 60. The first auxiliary negative pressure source 60 comprises at least one low pressure port 61 or 63. The low pressure port 61 or 63 is connected to the sample needle 23 or the rear sheath waste fluid cell 50. During measurement of the sample fluid by the sheath flow impedance counting cell 20, that is, as the sheath fluid in the sheath flow impedance counting cell 20 is formed and the sample needle 23 performs sampling and testing, at least the first auxiliary negative pressure source 60 is used to supply negative pressure to the sample needle 23 to enable the sample needle 23 to prepare the sample fluid or the first auxiliary negative pressure source 60 is used to supply negative pressure to the rear sheath waste fluid cell 50 to enable the rear sheath waste fluid cell 50 to discharge the waste fluid.

In the sheath flow impedance particle analyzer provided in the present application, one first auxiliary negative pressure source 60 is added and is connected to the sample needle 23 or is connected to the rear sheath waste fluid cell 50. As the sheath flow impedance counting cell 20 measures the sample fluid, the first auxiliary negative pressure source 60 supplies negative pressure to the sample needle 23 or the rear sheath waste fluid cell 50 to enable the sample needle 23 to prepare the sample fluid or the rear sheath waste fluid cell 50 to discharge the waste fluid, so that the measurement cycle of the sheath flow impedance particle analyzer is shortened and the measurement speed is increased.

The sheath flow impedance particle analyzer in the present application further comprises a plurality of valves, that is, further comprises a valve V2 to a valve V10. These valves are all solenoid valves that are closed when being powered on and are opened when being powered off.

As shown in FIG. 1, the pre-mixing cell 10 comprises a sample loading inlet port 12, a waste fluid outlet port 15, a sample outlet port 16, and an atmosphere interface port 18. The sample loading inlet port 12 is connected to a sample feeding tube 600 configured to feed the sample fluid. The waste fluid outlet port 15 is connected to a waste fluid cell 70 configured to discharge a waste fluid generated after cleaning the pre-mixing cell 10. The sample outlet port 16 is connected to the sample needle 23. The atmosphere interface port 18 is in communication with the atmosphere 300. The sample needle 23 comprises a feeding port 231, a first discharge port 232, and a second discharge port 235. The feeding port 231 is connected to the sample outlet port 16 of the pre-mixing cell 10. The valve V1 is disposed between the sample outlet port 16 and the feeding port 231. A syringe 236 is further disposed between the feeding port 231 and the valve V1. A discharge port of the syringe 236 is connected between the feeding port 231 of the sample needle 23 and the valve V1. A feeding port of the syringe 236 is connected to a sheath fluid cell 500 for the syringe 236 to draw in a sheath fluid. The syringe 236 is configured to push the sample fluid in the sample needle 23 into the sheath flow impedance counting cell 20. A barrier 24 is disposed between the front cell 21 and the rear cell 22. A gem hole 242 is provided in the barrier 24. During measurement, a sheath fluid flow surrounds a sample fluid to enable particles in the sample fluid to form a line to pass through the gem hole 242. A side of the front cell 21 is connected to the front sheath fluid inlet port 251 of the front sheath fluid cell 25. A waste fluid discharge port 213 is provided in the opposite other side of the front cell 21. The waste fluid discharge port 213 is connected to the waste fluid cell 70 by the valve V2. The first discharge port 232 of the sample needle 23 is inserted in the front cell 21 and is right opposite the gem hole 242 and is configured to supply a measurement sample fluid to the sheath flow impedance counting cell 20. The second discharge port 235 is connected to the first auxiliary negative pressure source 60 by the valve V3, so that the first auxiliary negative pressure source 60 draws the sample fluid. A rear sheath waste fluid outlet port 222 is provided at a position, right opposite the gem hole 242, of the rear cell 22. The rear sheath waste fluid outlet port 222 is connected to the rear sheath waste fluid outlet port 50. That is, the rear sheath waste fluid outlet port 222 is connected to the rear sheath waste fluid inlet port 51. The front sheath fluid cell 25 further comprises the valve V4 configured to control the front sheath fluid inlet port 251 to open or close. The front sheath fluid cell 25 is further connected to the sheath fluid cell 500 to add a sheath fluid to the front sheath fluid cell 25. The rear sheath cell 27 further comprises the valve V5 configured to control the rear sheath fluid inlet port 271 to open or close. The rear sheath cell 27 is further connected to the sheath fluid cell 500 to add a sheath fluid to the rear sheath cell 27. The rear sheath cell 27 is further connected to the atmosphere 300 by the valve V6. The valve V6 is in a normally closed state. When the sheath fluid in the rear sheath cell 27 needs to be completely emptied, the valve V6 is open.

The rear sheath waste fluid cell 50 is located below the sheath flow impedance counting cell 20. That is, when the sheath flow impedance particle analyzer is placed on the horizontal plane to work, the rear sheath waste fluid cell 50 is closer to the horizontal plane than the sheath flow impedance counting cell 20. The height of the highest fluid surface inside the rear sheath waste fluid cell 50 is lower than the height of the rear sheath waste fluid outlet port 222, so that a waste fluid flowing out of the rear sheath waste fluid outlet port 222 can be enabled to smoothly flow into the rear sheath waste fluid cell 50 to keep a stable sheath flow in the sheath flow impedance counting cell 20. The rear sheath waste fluid cell 50 further comprises a rear sheath waste fluid discharge port 53. The rear sheath waste fluid discharge port 53 is connected to the first auxiliary negative pressure source 60. In this embodiment, the rear sheath waste fluid cell 50 further comprises a sealing cover 54. The rear sheath waste fluid inlet port 51 is provided on the sealing cover 54. An atmosphere connecting port 55 is further provided on the sealing cover 54. The atmosphere connecting port 55 is connected to the atmosphere 300 by the valve V7. The valve V7 is set to a normally open state. That is, the rear sheath waste fluid cell 50 is in communication with the atmosphere 300. Because the sheath waste fluid cell 50 is in communication with the atmosphere 300 through the atmosphere connecting port 55, the negative pressure in the rear sheath waste fluid cell 50 can be prevented from interfering with the measurement by the sheath flow impedance counting cell 20 after the waste fluid in the rear sheath waste fluid cell 50 is emptied. The sealing cover 54 can further prevent the waste fluid in the rear sheath waste fluid cell 50 from overflowing into the sheath flow impedance particle analyzer, so that the measurement precision of the sheath flow impedance particle analyzer is prevented from being affected.

In this embodiment, the first auxiliary negative pressure source 60 is a sealed buffering cell. The buffering cell comprises two low pressure ports 61 and 63 and the valve V8 configured to control one low pressure port 63 to open or close. The other low pressure port 61 is connected to the sample needle 23 by the valve V3. The buffering cell further comprises a first connecting port 64, the valve V9 configured to control the first connecting port 64 to open or close, a second connecting port 65, and the valve V10 configured to control the second connecting port 65 to open or close. The low pressure port 61 is connected to the second discharge port 235 of the sample needle 23 by the valve V3. The low pressure port 63 is connected to the rear sheath waste fluid cell 50 by the valve V8. That is, the low pressure port 63 is connected to the rear sheath waste fluid discharge port 53 of the rear sheath waste fluid cell 50 by the valve V8. The first connecting port 64 is connected to the waste fluid cell 70 by the valve V9. The second connecting port 65 is connected to the atmosphere 300 by the valve V10. When the low pressure port 61 is closed by the valve V3, the low pressure port 63 is closed by the valve V8, the second connecting port 65 is closed by the valve V10, and the first connecting port 64 is opened by the valve V9, the waste fluid cell 70 is in communication with the buffering cell. When the negative pressure in the buffering cell is the same as the negative pressure of the waste fluid cell 70, the first connecting port 64 is closed by the valve V9 to enable the buffering cell to form an auxiliary negative pressure source.

In another embodiment, the low pressure port 61 can be connected to the rear sheath waste fluid discharge port 53 of the rear sheath waste fluid cell 50 by the valve V3. The low pressure port 63 can be connected to the second discharge port 235 of the sample needle 23 by the valve V8. The low pressure port 61 supplies a negative pressure for the rear sheath waste fluid cell 50 to discharge a waste fluid. The low pressure port 63 supplies a negative pressure for the sample needle 23 to draw in a sample fluid.

The buffering cell is located below the rear sheath waste fluid cell 50. That is, when the sheath flow impedance particle analyzer is placed on the horizontal plane to work, the buffering cell is closer to the horizontal plane than the rear sheath waste fluid cell 50. The height of the low pressure port 63 is lower than the height of lowest fluid surface inside the rear sheath waste fluid cell 50. After the buffering cell finishes preparing the sample fluid, the valve V3 is closed and the valve V8 is open, and residual negative pressure in the buffering cell is used to enable a small amount of waste fluid in the rear sheath waste fluid cell 50 to flow into the buffering cell, so that the waste fluid in the rear sheath waste fluid cell smoothly flows into the buffering cell by gravity. In addition, the valve V10 is opened to enable the buffering cell to be in communication with the atmosphere 300. The waste fluid in the rear sheath waste fluid cell 50 continues to flow into the buffering cell by gravity. Air above the waste fluid surface in the buffering cell is discharged into the atmosphere 300 through the valve V10 to enable the buffering cell to receive more waste fluid.

In other implementations that have no high test speed requirement, as a waste fluid is discharged into the buffering cell by the rear sheath waste fluid cell 50, the valve V10 may be in a closed state. That is, after the buffering cell finishes preparing a sample fluid, the valve V3 is closed and the valve V8 is open, so that remaining negative pressure in the buffering cell enables a part of waste fluid in the rear sheath waste fluid cell 50 to flow into the buffering cell. When there is balanced pressure in the buffering cell, that is, after the remaining negative pressure in the buffering cell is used up, the valve V8 is closed and the valve V9 and the valve V10 are opened to enable the waste fluid in the buffering cell to be completely discharged into the waste fluid cell 70. After auxiliary negative pressure source is formed in the buffering cell again, the valve V9 is then closed and the valve V8 is opened to enable the waste fluid in the rear sheath waste fluid cell 50 to flow into the buffering cell again. The negative pressure in the buffering cell may be adjusted to a relatively low state or the valve V8 controls the fluid flow entering the buffering cell to have a relatively slow speed. Therefore, as the waste fluid is discharged into the buffering cell by the rear sheath waste fluid cell 50, the measurement by the sheath flow impedance counting cell 20 is basically not affected.

The height of the first connecting port 64 is lower than that of lowest fluid surface inside the buffering cell. Therefore, after the valve V9 and the valve V10 are opened and the valve V8 is closed, the waste fluid in the buffering cell can be completely emptied into the waste fluid cell 70. The low pressure port 61, the low pressure port 63, and the second connecting port 65 are located at an upper portion of the buffering cell. The first connecting port 64 is located at a lower portion of the buffering cell. In this embodiment, the low pressure port 61 is provided in the top wall of the buffering cell, the low pressure port 63 and the second connecting port 65 are provided at an upper portion of a side wall of the buffering cell. The first connecting port 64 is provided at a lower portion of a side wall of the buffering cell.

In another embodiment, the low pressure port 63 may be provided in the top wall of the buffering cell. The second connecting port 65 may be provided in the top wall of the buffering cell. The first connecting port 64 may be provided in the bottom wall of the buffering cell.

A counting circuit 80 comprises a high potential electrode 81 electrically connected to the sheath fluid in the rear cell 22, a zero potential electrode 83 electrically connected to the sheath fluid in the front cell 21, and a signal processing unit 85 disposed between the high potential electrode 81 and the zero potential electrode 83. The front cell 21, the rear cell 22, the barrier 24, the sample needle 23, and the gem hole 242 are all made of an insulating material. In addition, connecting ports connected to the sheath flow impedance counting cell 20 are all made of an insulating material. In this way, the gem hole 242 is the only flow body path from a high potential electrode to a zero potential electrode.

In the sheath flow impedance particle analyzer of the present application, the valve V1 to the valve V10 are all solenoid valves that are in an open state when being powered off and in a closed state when being powered on. The valve V6 and the valve V7 are functional valves. That is, the valve V6 is always in a powered-on and closed state, and the valve V7 is always in a powered-off and open state.

Figure 4:
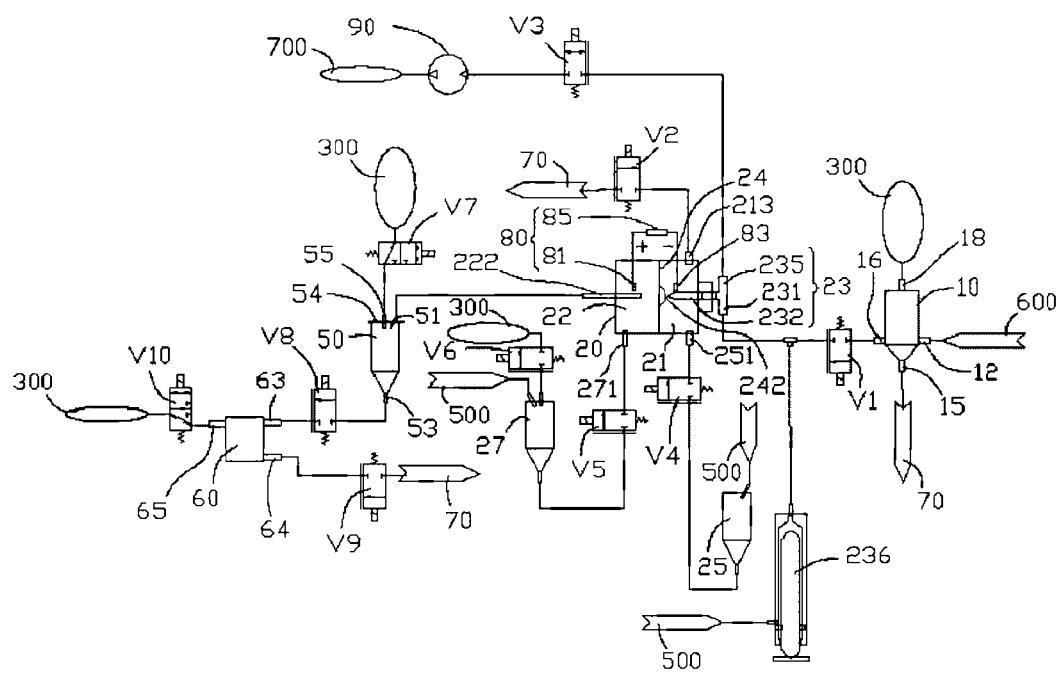
FIG. 4 is a schematic diagram of a fluid path and a measurement circuit of a fourth embodiment of a sheath flow impedance particle analyzer according to the present application.
Figure 5:
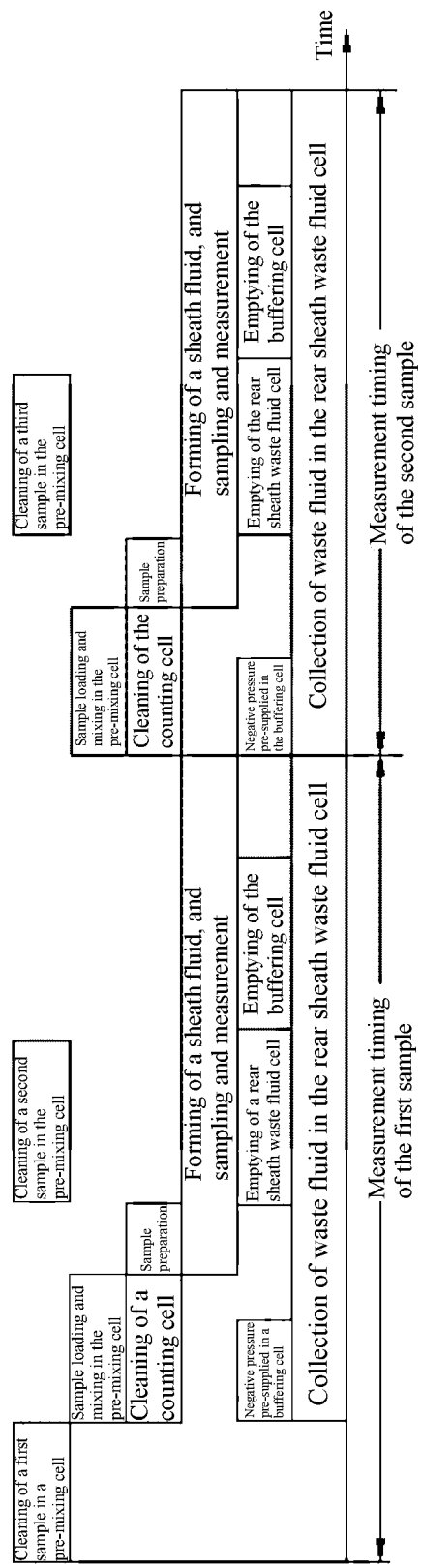
FIG. 5 is a timing diagram of measurement of a sample fluid by a sheath flow impedance particle analyzer according to the present application.

Refer to both FIGS. 1 and 4. FIG. 4 is a timing diagram of measurement of a sample fluid by a sheath flow impedance particle analyzer according to the present application. The first time of measurement of a sample fluid since the sheath flow impedance particle analyzer in the present application is turned on comprises the following steps:

cleaning the pre-mixing cell 10, in which the valve V1 is powered on and closed, that is, the sample outlet port 16 is closed, a diluent is added to the pre-mixing cell 10 for cleaning, and a waste fluid generated after cleaning is discharged into the waste fluid cell 70; and cleaning the sheath flow impedance counting cell 20, in which the front cell 21 is cleaned by a sheath fluid in the front sheath fluid cell 25 through the front sheath fluid inlet port 251, the rear cell 22 is cleaned by a sheath fluid in the rear sheath fluid cell 27 through the rear sheath fluid inlet port 271, a waste fluid generated after the front cell 21 is cleaned is discharged into the waste fluid cell 70 through the waste fluid discharge port 213, and a waste fluid generated after the rear cell 22 is cleaned is discharged into the rear sheath waste fluid cell 50 through the rear sheath waste fluid outlet port 222 and the rear sheath waste fluid inlet port 51. During cleaning of the sheath flow impedance counting cell 20, a part of sheath fluid in the front cell 21 flows into the buffering cell through the first discharge port 232 and the second discharge port 235 of the sample needle 23, the valve V3, and the low pressure port 61 of the buffering cell to clean the sample needle 23. Alternatively, the sheath fluid in the syringe 236 flows into the buffering cell through the feeding port 231 and the second discharge port 235 of the sample needle 23, the valve V3, and the low pressure port 61 of the buffering cell, so that the sample needle 23 can be cleaned. Alternatively, the sheath fluid in the front cell 21 flows into the buffering cell through the first discharge port 232 and the second discharge port 235 of the sample needle 23, the valve V3, and the low pressure port 61 of the buffering cell, at the same time, the sheath fluid in the syringe 236 also flows into the buffering cell through the feeding port 231 and the second discharge port 235 of the sample needle 23, the valve V3, and the low pressure port 61 of the buffering cell, to jointly clean the sample needle 23, and the waste fluid in the buffering cell is discharged into the waste fluid cell 70. In addition, during cleaning of the sheath flow impedance counting cell 20, a blood sample is added to the pre-mixing cell 10 and a reagent is added, so that the blood sample and the reagent react to obtain a sample fluid with a predetermined dilution ratio. In addition, the valve V3, the valve V8, and the valve V10 are powered on and closed, to close the low pressure port 61, the low pressure port 63, and the second connecting port 65 of the buffering cell. In this case, the waste fluid cell 70 is in communication with the buffering cell through the valve V9, and the negative pressure in the waste fluid cell 70 enables the buffering cell to form a pre-supplied negative pressure source. Therefore, the cleaning of the sheath flow impedance counting cell 20, the addition and even mixing of a sample fluid in the pre-mixing cell 10, the cleaning of the sample needle 23, and negative pressure pre-supply in the buffering cell can be performed within the same period. When the cleaning of the sheath flow impedance counting cell 20 is completed, the sample has been evenly mixed in the pre-mixing cell 10.

The step of using the sheath flow impedance counting cell 20 to measure the sample fluid is as follows: feeding the sheath fluid in the front sheath fluid cell 25 into the front cell 21 through the front sheath fluid inlet port 251, and feeding the sheath fluid in the rear sheath fluid cell 27 into the rear cell 22 through the rear sheath fluid inlet port 271, to form a sheath fluid flow of the sheath fluid in the front cell 21 flowing toward the rear cell 22 through the gem hole 242 in the sheath flow impedance counting cell 20. That is, sheath fluid preparation in the front cell 21 and the rear cell 22 are made in the sheath flow impedance counting cell 20, to finish forming the sheath fluid in the sheath flow impedance counting cell 20. During the sheath fluid preparation in the front cell 21 and the rear cell 22 in the sheath flow impedance counting cell 20, the valve V1 and the valve V3 are powered off. That is, the valve V1 and the valve V3 are opened. The negative pressure pre-supplied in the buffering cell draws the sample fluid in the pre-mixing cell 10 into the sample needle 23 to prepare the sample fluid. That is, under the negative pressure, the sample fluid in the pre-mixing cell 10 flows into the sample needle 23 through the sample outlet port 16, the valve V1, and the feeding port 231, so that a conduit between the valve V1 and the second discharge port 235 is filled with the sample fluid. When the sheath fluid preparation in the front cell 21 and the rear cell 22 is finished, the sample needle 23 also finishes preparing a sample fluid. The valve V1 and the valve V3 are powered on and closed, that is, the sample outlet port 16 is closed, and the low pressure port 61 is closed. The syringe 236 pushes the sample fluid in the sample needle 23 into the front cell 21 through the first discharge port 232. The sample fluid starts to converge, gradually turns thinner, accelerates, and flows in an axial direction of the gem hole 242 at the first discharge port 232 of the sample needle 23 under a sheath fluid flow, and is surrounded by the sheath fluid flow to pass through the center of the gem hole 242 to form a particle flow beam. The diameter of the particle flow beam is equal to the diameter of a single particle passing through the gem hole 242, so that a plurality of particles can be prevented from passing through the gem hole 242 at the same time. Because particles (for example, blood cells) to be tested are poor conductors, when a sample fluid that contains the particles to be tested passes through the gem hole 242, the particles to be tested take place of a conductive fluid body to cause a change in the impedance characteristic of the gem hole 242. Because the gem hole 242 is the only path from a high potential electrode to a zero potential electrode, a change correspondingly occurs in the impedance characteristic between the high potential electrode 81 and the zero potential electrode 83. The magnitude of the change is directly proportional to the volume of a particle. The signal processing unit 85 converts such changes into a pulse waveform. The volume and quantity of particles can be obtained by analyzing the magnitude and quantity of the pulse waveform. The sample fluid is surrounded by a front sheath fluid to pass through the gem hole 242 to enter the rear cell 22, and turns into a rear sheath waste fluid. The rear sheath waste fluid flows into the rear sheath waste fluid cell 50 through the rear sheath waste fluid outlet port 222 and the rear sheath waste fluid inlet port 51. The sampling and measurement by the sheath flow impedance particle analyzer are completed, so that the first time of measurement of a sample fluid since the sheath flow impedance particle analyzer is turned on is completed.

During measurement of the sample fluid by the sheath flow impedance counting cell 20, a plurality of parallel actions are designed. For example, in parallel, the pre-mixing cell 10 performs cleaning in a next measurement cycle (second time of measurement of a sample fluid), a waste fluid is discharged into the buffering cell by the rear sheath waste fluid cell 50, the waste fluid in the buffering cell is emptied into a waste fluid cell 700, and the buffering cell completes a next time of negative pressure pre-supply. Details are as follows: The valve 1 is in a powered-on and closed state, that is, the sample outlet port 16 is in a closed state. Therefore, during measurement of the sample fluid by the sheath flow impedance counting cell 20, a remaining useless sample fluid in a previous time of measurement in the pre-mixing cell 10 is eliminated and a fluid is added for cleaning. The valve V8 is powered off to be opened. The rear sheath waste fluid discharge port 53 of the rear sheath waste fluid cell 50 is in communication with the low pressure port 63 of the buffering cell. The waste fluid in the rear sheath waste fluid cell 50 flows into the buffering cell under the remaining pre-supplied negative pressure in the buffering cell. After a waste fluid is discharged into the buffering cell by the rear sheath waste fluid cell 50 for a period of time, that is, there is already no pre-supplied negative pressure in the buffering cell, the valve V10 is powered off to be opened so that the buffering cell is in communication with the atmosphere 300. The waste fluid in the rear sheath waste fluid cell 50 flows into the buffering cell by gravity. The valve V8 is then powered on and closed. At this time, the low pressure port 63 is closed by the valve V8. The buffering cell is in communication with the atmosphere 300. The waste fluid in the buffering cell is completely discharged into the waste fluid cell 700 through the first connecting port 64 and the valve V9. That is, the waste fluid in the buffering cell is emptied. The valve 10 is then powered on and closed. At this time, only the first connecting port 64 of the buffering cell is in communication with the waste fluid cell 700. The waste fluid cell 700 enables the buffering cell to complete negative pressure pre-supply in a next measurement cycle. During measurement of the sample fluid by the sheath flow impedance counting cell 20, the rear sheath waste fluid in the rear cell 22 keeps being discharged into the rear sheath waste fluid cell 50. Negative pressure can be pre-supplied repeatedly in the buffering cell, a waste fluid can be repeatedly discharged into the buffering cell by the rear sheath waste fluid cell 50, and the waste fluid in the buffering cell can be repeatedly emptied into the waste fluid cell 700. When the measurement is completed, the waste fluids in the rear sheath waste fluid cell 50 and the buffering cell also have been basically discharged, and a next time of measurement can be performed without a need to wait. During measurement of the sample fluid by the sheath flow impedance counting cell 20, it may be set to evenly mix the sample fluid in the pre-mixing cell 10.

Referring to both FIGS. 1 and 4, the measurement in the next time of measurement cycle by the sheath flow impedance particle analyzer comprises the following step:

cleaning the sheath flow impedance counting cell 20, powering on and closing the valve V1, adding a sheath fluid to the sheath flow impedance counting cell 20 for cleaning, and cleaning the sample needle 23. During the cleaning of the sheath flow impedance counting cell 20, a current sample fluid is added to the pre-mixing cell 10 to perform even mixing. The two steps can be completed at the same time point. That is, when the cleaning of the sheath flow impedance counting cell 20 is completed, the sample fluid in the pre-mixing cell 10 has been evenly mixed. Alternatively, the sample loading and even mixing of the current sample fluid in the pre-mixing cell 10 may start from a last measurement cycle and last until a current cleaning stage of the sheath flow impedance counting cell, provided that sample loading and even mixing of the current sample fluid are completed when the current cleaning of the sheath flow impedance counting cell is completed.

The sheath flow impedance counting cell 20 is used to perform measurement. After the cleaning of the sheath flow impedance counting cell 20 is completed, the sheath fluid in the front sheath fluid cell 25 is fed into the front cell 21 through the front sheath fluid inlet port 251, and the sheath fluid in the rear sheath fluid cell 27 is fed into the rear cell 22 through the rear sheath fluid inlet port 271. That is, the sheath fluid preparation in the front tank 21 and the rear tank 22 is performed in the sheath flow impedance counting tank 20. During the sheath fluid preparation in the front cell 21 and the rear cell 22 in the sheath flow impedance counting cell 20, the valve 1 is powered off, the negative pressure in the buffering cell draws the sample fluid in the pre-mixing cell 10 into the sample needle 23, the valve 1 and the valve 3 are then powered on and closed, and the sample outlet port 16 is closed. Therefore, when the sheath fluid preparation in the front cell 21 and the rear cell 22 is completed, the sample needle 23 also finishes preparing the sample fluid. The syringe 236 pushes the sample fluid in the sample needle 23 into the front cell 21 through the first discharge port 232 to enable the particle flow beam in the front cell 21 of the sheath flow impedance counting cell 20 to pass through the gem hole 242 for measurement. During measurement of the sample fluid by the sheath flow impedance counting cell 20, the pre-mixing cell 10 can complete cleaning in a further next (third time of measurement of a sample fluid) measurement cycle, a waste fluid is discharged into the buffering cell again by the rear sheath waste fluid cell 50, the waste fluid in the buffering cell is emptied into the waste fluid cell 700 again. The buffering cell completes another time of negative pressure pre-supply.

Therefore, in this embodiment, in every measurement cycle after the first time of measurement of the sample fluid since the sheath flow impedance particle analyzer is turned on, only the time required for the step of cleaning the sheath flow impedance counting cell 20 and the step of measurement by the sheath flow impedance counting cell 20 is needed. The fluid discharge and cleaning of the pre-mixing cell 10, the sample loading and even mixing of the pre-mixing cell 10, the discharge of the waste fluid in the rear sheath waste fluid cell 50, the emptying of the waste fluid in the buffering cell, the negative pressure pre-supply of the buffering cell, and the sampling and preparation of the sample fluid in the sample needle 23 can all be completed during the cleaning of the sheath flow impedance counting cell 20 and the measurement of the sample fluid by the sheath flow impedance counting cell 20. Details are as follows: During cleaning of the sheath flow impedance counting cell 20, the pre-mixing cell 10 performs sample loading and even mixing. When the cleaning of the sheath flow impedance counting cell 20 is completed, the sample loading and even mixing of the pre-mixing cell 10 have been completed. During measurement of the sample fluid by the sheath flow impedance counting cell 20, the fluid discharge and cleaning of the pre-mixing cell 10, the discharge of the waste fluid in the rear sheath waste fluid cell 50, the emptying of the waste fluid in the buffering cell, the negative pressure pre-supplied in the buffering cell, and the sample preparation of the sample needle 23 are all completed in this period. In addition, during measurement of the sample fluid by the sheath flow impedance counting cell 20, the buffering cell may establish negative pressure pre-supply repeatedly, and the pre-supplied negative pressure is used to enable the rear sheath waste fluid cell 50 to discharge the waste fluid. A person skilled in the art can understand that the discharge of the waste fluid in the rear sheath waste fluid cell 50 may be performed during the cleaning of the sheath flow impedance counting cell 20. Compared with the serial measurement actions by an existing sheath flow impedance particle analyzer, one buffering cell is added to the sheath flow impedance particle analyzer in this embodiment to enable the waste fluid in the rear sheath waste fluid cell 50 to first enter the buffering cell. In addition, in this process, the pressure in the rear sheath waste fluid cell 50 can be approximately equal to the atmospheric pressure, and a stable sample flow in the sheath flow impedance counting cell 20 is not affected. The buffering cell and the rear sheath waste fluid cell 50 are then isolated. The waste fluid cell 70 and the buffering cell are then connected, and the waste fluid in the buffering cell is rapidly emptied. In this way, the discharge of the waste fluid in the rear sheath waste fluid cell 50 can be completed in parallel during the measurement by the sheath flow impedance counting cell 20, so that the measurement cycle of the sheath flow impedance particle analyzer is greatly shortened, and the measurement speed is increased. In addition, the negative pressure in the buffering cell may supply a power source for sample preparation. Therefore, sample preparation does not need an additional power source, so that the structure can be simplified.

Figure 2:
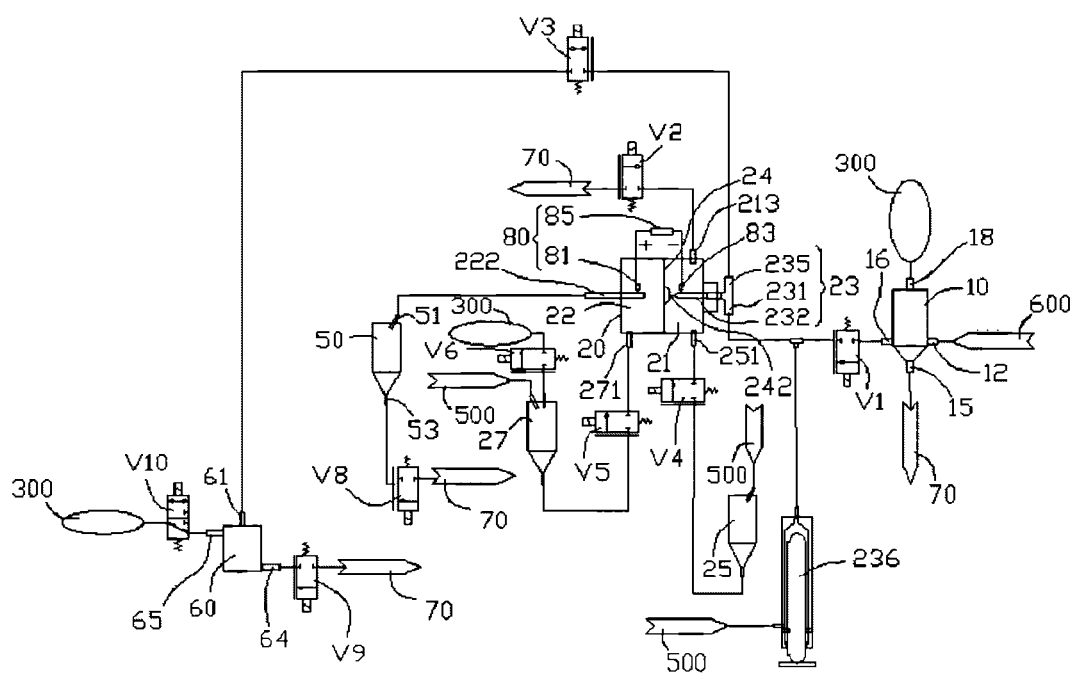
FIG. 2 is a schematic diagram of a fluid path and a measurement circuit of a second embodiment of a sheath flow impedance particle analyzer according to the present application.

Referring to FIG. 2, FIG. 2 is a schematic diagram of a fluid path and a measurement circuit of a second embodiment of a sheath flow impedance particle analyzer according to the present application. The structure of the sheath flow impedance particle analyzer in the second embodiment is similar to that of the sheath flow impedance particle analyzer in the first embodiment. A difference between the second embodiment and the first embodiment lies in that: in the second embodiment, the first auxiliary negative pressure source 60 is also a buffering cell, but one low pressure port 63 is omitted in the buffering cell in the second embodiment based on the first embodiment, that is, the low pressure port connected to the rear sheath waste fluid cell 50 is omitted. The other low pressure port 61 of the buffering cell in the second embodiment is connected to the sample needle 23 by the valve V3. The first connecting port 64 is connected to the waste fluid cell 70 by the valve V9. The second connecting port 65 is connected to the atmosphere 300 by the valve V10. The waste fluid discharge port 53 of the sheath waste fluid cell 50 in the second embodiment is directly connected to the waste fluid cell 700 by the valve V8, and does not need to be connected to the waste fluid cell 700 by the buffering cell. The valve V8 is in a powered-off normally open state. The sealing cover 54, the atmosphere connecting port 55, and the valve V7 are omitted in the sheath waste fluid cell 50. An opening is provided in the top of the sheath waste fluid cell 50. That is, the sheath waste fluid cell 50 does not need to be in communication with the atmosphere 300 through the atmosphere connecting port 55 and the valve V7, by instead is in direct communication with the atmosphere 300. The rear sheath waste fluid inlet port 51 is directly placed in the opening in the top of the sheath waste fluid cell 50.

A measurement procedure of the second embodiment of the sheath flow impedance particle analyzer in the present application is similar to that of the first embodiment. The first time of measurement of a sample fluid since the sheath flow impedance particle analyzer in the second embodiment is turned on comprises the following steps:

cleaning the pre-mixing cell 10, powering on and closing the valve V1, adding a sheath fluid to the pre-mixing cell 10 for cleaning, and discharging a waste fluid generated from cleaning into the waste fluid cell 70; and cleaning the sheath flow impedance counting cell 20, in which the front cell 21 is cleaned by a sheath fluid in the front sheath fluid cell 25 through the front sheath fluid inlet port 251, the rear cell 22 is cleaned by a sheath fluid in the rear sheath fluid cell 27 through the rear sheath fluid inlet port 271, a waste fluid generated after the front cell 21 is cleaned is discharged into the waste fluid cell 70 through the waste fluid discharge port 213, and a waste fluid generated after the rear cell 22 is cleaned is discharged into the rear sheath waste fluid cell 50 through the rear sheath waste fluid outlet port 222 and the rear sheath waste fluid inlet port 51, so that the cleaning of the sheath flow impedance counting cell 20 is completed. During cleaning of the sheath flow impedance counting cell 20, the sample needle 23 is also cleaned. In addition, during the cleaning of the sheath flow impedance counting cell 20, a blood sample is added to the pre-mixing cell 10 and a reagent is added, so that the blood sample and the reagent react to obtain a sample fluid with a predetermined dilution ratio. In addition, the valve V3 and the valve V10 are powered on and closed, to close the low pressure port 61 of the buffering cell and the second connecting port 65. At this time, the waste fluid cell 70 is in communication with the buffering cell through the valve V9. The negative pressure in the waste fluid cell 70 enables the buffering cell to form one auxiliary negative pressure source. Therefore, the cleaning of the sheath flow impedance counting cell 20, the addition and even mixing of a sample fluid in the pre-mixing cell 10, and negative pressure pre-supplied in the buffering cell are completed within the same period.

The sheath flow impedance counting cell 20 is used to measure a sample fluid. The sheath fluid in the front sheath fluid cell 25 is fed into the front cell 21 through the front sheath fluid inlet port 251, and the sheath fluid in the rear sheath fluid cell 27 is fed into the rear cell 22 through the rear sheath fluid inlet port 271, to form front and rear sheath fluids in the sheath flow impedance counting cell 20. During the formation of the front and rear sheath fluids in the sheath flow impedance counting cell 20, the valve V1 and the valve V3 are powered off. The negative pressure in the buffering cell draws the sample fluid in the pre-mixing cell 10 into the sample needle 23. That is, the sample fluid flows into the sample needle 23 through the valve V1 and the feeding port 231, so that a conduit between the valve V1 and the second discharge port 235 is filled with the sample fluid. The valve V1 and the valve V3 are powered on and closed. The syringe 236 pushes the sample fluid in the sample needle 23 into the front cell 21 through the first discharge port 232 to enable a particle flow beam in the front cell 21 to pass through the gem hole 242 for measurement. During measurement of the sample fluid by the sheath flow impedance counting cell 20, a rear sheath waste fluid in the rear cell 22 keeps being discharged into the rear sheath waste fluid cell 50. Because there is no sealing cover, the rear sheath waste fluid cell 50 is connected to the waste fluid cell 70 by the valve V8. During measurement, the valve V8 is opened, and the waste fluid in the rear sheath waste fluid cell 50 is discharged into the waste fluid cell 70. Because there is no sealing cover 54, as a waste fluid is discharged by the rear sheath waste fluid cell 50, the pressure is kept approximately equal to the atmospheric pressure, so that the measurement by the sheath flow impedance counting cell 20 is not affected. When the measurement is completed, the waste fluids in the rear sheath waste fluid cell 50 and the buffering cell also have been basically discharged, and a next time of measurement can be performed without a need to wait. During measurement of the sample fluid by the sheath flow impedance counting cell 20, it may also be set to complete even mixing of the sample fluid in the pre-mixing cell 10.

The measurement of a next measurement cycle in the second embodiment of the sheath flow impedance particle analyzer in the present application comprises the following step:

cleaning the sheath flow impedance counting cell 20, powering on and closing the valve V1, adding a sheath fluid to the sheath flow impedance counting cell 20 for cleaning, and cleaning the sample needle 23. During the cleaning of the sheath flow impedance counting cell 20, a current sample fluid is added to the pre-mixing cell 10 to perform even mixing. The two steps can be completed at the same time point. That is, when the cleaning of the sheath flow impedance counting cell 20 is completed, the sample fluid in the pre-mixing cell 10 has been evenly mixed. Alternatively, the sample loading and even mixing of the current sample fluid in the pre-mixing cell 10 may start from a last measurement cycle and last until a current cleaning stage of the sheath flow impedance counting cell 20, provided that sample loading and even mixing of the current sample fluid are completed when the current cleaning of the sheath flow impedance counting cell 20 is completed.

The sheath flow impedance counting cell 20 is used to perform measurement. After the cleaning of the sheath flow impedance counting cell 20 is completed, the sheath fluid in the front sheath fluid cell 25 is fed into the front cell 21 through the front sheath fluid inlet port 251, and the sheath fluid in the rear sheath fluid cell 27 is fed into the rear cell 22 through the rear sheath fluid inlet port 271, to form front and rear sheath fluids required by the sheath flow impedance counting cell 20. During the formation of the front and rear sheath fluids in the sheath flow impedance counting cell 20, the valve V1 is powered off. The negative pressure in the buffering cell draws the sample fluid in the pre-mixing cell 10 into the sample needle 23. The valve V1 and the valve V3 are then powered on and closed. When the sheath fluid preparation in the front cell 21 and the rear cell 22 is completed, the sample needle 23 also finishes preparing a sample fluid. The syringe 236 pushes the sample fluid in the sample needle 23 into the front cell 21 through the first discharge port 232 to enable the particle flow beam in the front cell 21 of the sheath flow impedance counting cell 20 to pass through the gem hole 242 for measurement. During measurement of the sample fluid by the sheath flow impedance counting cell 20, the pre-mixing cell 10 can complete cleaning in a further next measurement cycle. A waste fluid is discharged into the waste fluid cell 70 by the rear sheath waste fluid cell 50. The buffering cell completes another time of negative pressure pre-supply.

Therefore, in a measurement cycle after the first time of measurement of a sample fluid since the sheath flow impedance particle analyzer in the second embodiment is turned on, only the time required for the step of cleaning the sheath flow impedance counting cell 20 and the step of measurement by the sheath flow impedance counting cell 20 is needed in each measurement cycle. The fluid discharge and cleaning of the pre-mixing cell 10, the sample loading and even mixing of the pre-mixing cell 10, the negative pressure pre-supply of the buffering cell, and the sampling and preparation of the sample fluid in the sample needle 23 can all be completed during the cleaning of the sheath flow impedance counting cell 20 and the measurement of the sample fluid by the sheath flow impedance counting cell 20. Compared with the serial measurement actions by an existing sheath flow impedance particle analyzer, the sheath flow impedance particle analyzer in this embodiment is connected to the buffering cell of the waste fluid cell 70. The negative pressure of the waste fluid cell 70 is used to establish stable negative pressure in the buffering cell to provide a stable power source for sample preparation, so that the costs are low and parallel measurement and sample preparation can be implemented. In addition, the sealing cover of the rear sheath waste fluid cell 50 is omitted, so that parallel measurement and the discharge of the waste fluid in the rear sheath waste fluid cell 50 are implemented, so that the measurement cycle of the sheath flow impedance particle analyzer is shortened and the measurement speed is increased.

Figure 3:
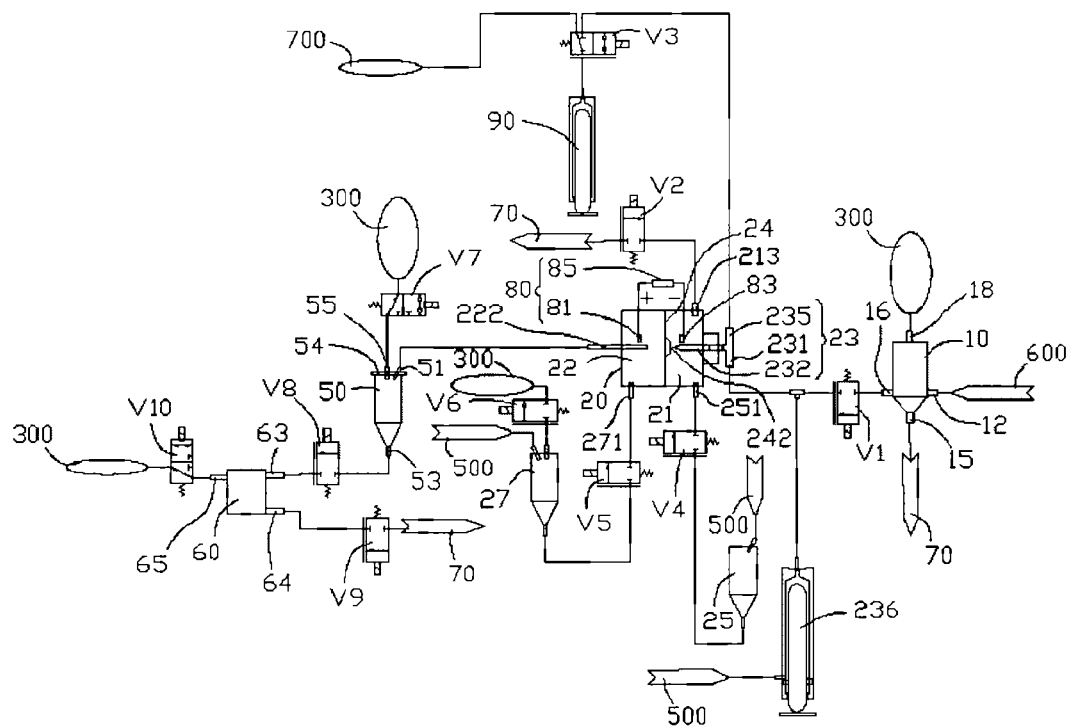
FIG. 3 is a schematic diagram of a fluid path and a measurement circuit of a third embodiment of a sheath flow impedance particle analyzer according to the present application.

Referring to FIG. 3, FIG. 3 is a schematic diagram of a fluid path and a measurement circuit of a third embodiment of a sheath flow impedance particle analyzer according to the present application. The structure of the sheath flow impedance particle analyzer in the third embodiment is similar to that of the sheath flow impedance particle analyzer in the first embodiment. A difference between the third embodiment and the first embodiment lies in that: In the third embodiment, one second auxiliary negative pressure source 90 is added, and one low pressure port 61 is omitted in the first auxiliary negative pressure source 60.

In the third embodiment, the first auxiliary negative pressure source 60 is a buffering cell. The low pressure port 61 is omitted in the buffering cell based on the first embodiment. The second auxiliary negative pressure source 90 is a syringe (as shown in FIG. 3). The syringe is connected to the second discharge port 235 of the sample needle 23 by the valve V3. The second auxiliary negative pressure source 90 is further connected to a waste fluid barrel 700. The waste fluid barrel 700 is configured to store a remaining sample fluid in the sample needle 23 after the sheath flow impedance particle analyzer completes measurement. A person skilled in the art can understand that the syringe in FIG. 3 may be a constant displacement pump, provided that the constant displacement pump is combined with a corresponding air source and valve.

Referring to FIG. 4, FIG. 4 is a schematic diagram of a fluid path and a measurement circuit of a fourth embodiment of a sheath flow impedance particle analyzer according to the present application. The structure of the sheath flow impedance particle analyzer in the fourth embodiment is similar to the sheath flow impedance particle analyzer in the third embodiment. A difference between the fourth embodiment and the third embodiment lies in that: In the fourth embodiment, the second auxiliary negative pressure source 90 may be a fluid pump, a peristaltic pump or the like with a small discharge amount, and can supply negative pressure to provide a stable power source for sample preparation.

Measurement procedures in the third and fourth embodiments of the sheath flow impedance particle analyzer in the present application are similar to the measurement procedure in the first embodiment. A first time of measurement of a sample fluid after the sheath flow impedance particle analyzer in the third and fourth embodiments is turned on comprises the following steps:

cleaning the pre-mixing cell 10, powering on and closing the valve V1, adding a sheath fluid to the pre-mixing cell 10 for cleaning, and discharging a waste fluid generated from cleaning into the waste fluid cell 70; and cleaning the sheath flow impedance counting cell 20, in which the front cell 21 is cleaned by a sheath fluid in the front sheath fluid cell 25 through the front sheath fluid inlet port 251, the rear cell 22 is cleaned by a sheath fluid in the rear sheath fluid cell 27 through the rear sheath fluid inlet port 271, a waste fluid generated after the front cell 21 is cleaned is discharged into the waste fluid cell 70 through the waste fluid discharge port 213, a waste fluid generated after the rear cell 22 is cleaned is discharged into the rear sheath waste fluid cell 50 through the rear sheath waste fluid outlet port 222 and the rear sheath waste fluid inlet port 51, and during cleaning of the sheath flow impedance counting cell 20, a blood sample is added to the pre-mixing cell 10 and a reagent is added, so that the blood sample and the reagent react to obtain a sample fluid with a predetermined dilution ratio. Therefore, the cleaning of the sheath flow impedance counting cell 20 and the addition and even mixing of a sample fluid in the pre-mixing cell 10 are performed within the same period. When the cleaning of the sheath flow impedance counting cell 20 is completed, the sample has been evenly mixed in the pre-mixing cell 10.

The sheath flow impedance counting cell 20 is used to measure a sample fluid. The sheath fluid in the front sheath fluid cell 25 is fed into the front cell 21 through the front sheath fluid inlet port 251, and the sheath fluid in the rear sheath fluid cell 27 is fed into the rear cell 22 through the rear sheath fluid inlet port 271, to form front and rear sheath fluids in the sheath flow impedance counting cell 20. During the formation of the front and rear sheath fluids in the sheath flow impedance counting cell 20, the valve V1 and the valve V3 are powered off. That is, the valve V1 and the valve V3 are opened. The negative pressure in the second auxiliary negative pressure source 90 draws the sample fluid in the pre-mixing cell 10 into the sample needle 23. That is, the second auxiliary negative pressure source 90 draws the sample fluid to flow into the sample needle 23 through the valve V1 and the feeding port 231, so that a conduit between the valve V1 and the second discharge port 235 is filled with the sample fluid. When the sheath fluid preparation in the front cell 21 and the rear cell 22 is completed, the sample needle 23 also finishes preparing a sample fluid. The valve V1 and the valve V3 are powered on and closed, the syringe 236 pushes the sample fluid in the sample needle 23 into the front cell 21 through the first discharge port 232 to enable the particle flow beam in the front cell 21 of the sheath flow impedance counting cell 20 to pass through the gem hole 242 for measurement.

During measurement of the sample fluid by the sheath flow impedance counting cell 20, a plurality of parallel actions are designed. For example, in parallel, the pre-mixing cell 10 can perform cleaning in a next measurement cycle (a second time of measurement of a sample fluid), a waste fluid is discharged into the buffering cell by the rear sheath waste fluid cell 50, the waste fluid in the buffering cell is emptied into the waste fluid cell 700, and the buffering cell completes a next time of negative pressure pre-supply. Details are as follows: The valve V8 is powered off to be opened. The rear sheath waste fluid discharge port 53 of the rear sheath waste fluid cell 50 is in communication with the low pressure port 63 of the buffering cell. The remaining pre-supplied negative pressure in the buffering cell enables the waste fluid in the rear sheath waste fluid cell 50 to flow into the buffering cell. After the negative pressure pre-supplied in the buffering cell is used up, the valve V8 is powered on and closed, and the valve V10 is powered on to be opened. The buffering cell is in communication with the atmosphere 300. The waste fluid in the rear sheath waste fluid cell 50 flows into the buffering cell by gravity. The valve V8 is then powered on and closed, and the valve V9 is then opened so that the waste fluid in the buffering cell is completely discharged into the waste fluid cell 700, that is, the waste fluid in the buffering cell is emptied. The valve V10 is then powered on and closed. At this time, only the first connecting port 64 of the buffering cell is in communication with the waste fluid cell 700. The waste fluid cell 700 enables the buffering cell to complete negative pressure pre-supply in a next measurement cycle. During measurement of the sample fluid by the sheath flow impedance counting cell 20, a rear sheath waste fluid in the rear cell 22 keeps being discharged into the rear sheath waste fluid cell 50. When the measurement is completed, the waste fluids in the rear sheath waste fluid cell 50 and the buffering cell also have been basically discharged, and a next time of measurement can be performed without a need to wait. During measurement of the sample fluid by the sheath flow impedance counting cell 20, it may also be set to complete even mixing of a sample in the pre-mixing cell 10.

A next measurement cycle in the third and fourth embodiments of the sheath flow impedance particle analyzer in the present application comprises the following step:

cleaning the sheath flow impedance counting cell 20, powering on and closing the valve V1, and adding a sheath fluid to the sheath flow impedance counting cell 20 for cleaning. During the cleaning of the sheath flow impedance counting cell 20, a current sample fluid is added to the pre-mixing cell 10 to perform even mixing. The two steps can be completed at the same time point. That is, when the cleaning of the sheath flow impedance counting cell 20 is completed, the sample fluid in the pre-mixing cell 10 has been evenly mixed. Alternatively, the sample loading and even mixing of the current sample fluid in the pre-mixing cell 10 may start from a last measurement cycle and last until a current cleaning stage of the sheath flow impedance counting cell 20, provided that sample loading and even mixing of the current sample fluid are completed when the current cleaning of the sheath flow impedance counting cell 20 is completed.

The sheath flow impedance counting cell 20 is used to perform measurement. After the cleaning of the sheath flow impedance counting cell 20 is completed, the sheath fluid in the front sheath fluid cell 25 is fed into the front cell 21 through the front sheath fluid inlet port 251, and the sheath fluid in the rear sheath fluid cell 27 is fed into the rear cell 22 through the rear sheath fluid inlet port 271, to form front and rear sheath fluids required by the sheath flow impedance counting cell 20. During the formation of the front and rear sheath fluids in the sheath flow impedance counting cell 20, the valve V1 is powered off. The negative pressure in the second auxiliary negative pressure source 90 draws the sample fluid in the pre-mixing cell 10 into the sample needle 23. When the sheath fluid preparation in the front cell 21 and the rear cell 22 is completed, the sample needle 23 also finishes preparing a sample fluid. The valve V1 and the valve V3 are then powered on and closed. The syringe 236 pushes the sample fluid in the sample needle 23 into the front cell 21 through the first discharge port 232 to enable the particle flow beam in the front cell 21 of the sheath flow impedance counting cell 20 to pass through the gem hole 242 for measurement. During measurement of the sample fluid by the sheath flow impedance counting cell 20, the pre-mixing cell 10 can complete cleaning in a further next measurement cycle. A waste fluid is discharged into the buffering cell again by the rear sheath waste fluid cell 50. The waste fluid in the buffering cell is emptied into the waste fluid cell 700 again. The buffering cell completes another time of negative pressure pre-supply.

Therefore, in a measurement cycle after the sheath flow impedance particle analyzer in the third and fourth embodiments has measured a sample fluid for the first time, only the time required for the step of cleaning the sheath flow impedance counting cell 20 and the step of measurement by the sheath flow impedance counting cell 20 is needed in each measurement cycle. The fluid discharge and cleaning of the pre-mixing cell 10, the sample loading and even mixing of the pre-mixing cell 10, the discharge of the waste fluid in the rear sheath waste fluid cell 50 to the buffering cell, the emptying of the waste fluid in the buffering cell into the waste fluid cell 700, another time of negative pressure pre-supply in the buffering cell, and sample fluid preparation in the sample needle 23 can all be completed during the cleaning of the sheath flow impedance counting cell 20 and the measurement by the sheath flow impedance counting cell 20. A person skilled in the art can understand that the discharge of the waste fluid in the rear sheath waste fluid cell 50 may be performed during the cleaning of the sheath flow impedance counting cell 20. Compared with the serial measurement actions by an existing sheath flow impedance particle analyzer, one buffering cell and one second auxiliary negative pressure source 90 are added to the sheath flow impedance particle analyzer in this embodiment, and a plurality of measurement actions can be completed in parallel during measurement, so that the measurement cycle of the sheath flow impedance particle analyzer is greatly shortened, and the measurement speed is increased.

A person skilled in the art can understand that in another embodiment, there may be no first auxiliary negative pressure source. The second auxiliary negative pressure source 90 provides a power source for sample preparation, so that measurement of the sample fluid and sample preparation in the sheath flow impedance counting cell 20 are performed in parallel. The sealing cover is omitted, so that measurement of the sample fluid in the sheath flow impedance counting cell 20 and the discharge of the waste fluid in the rear sheath waste fluid cell 50 are performed in parallel, thereby shortening the measurement cycle of the sheath flow impedance particle analyzer. If the sealing cover 54 is omitted, a waste fluid may overflow into the instrument. In another embodiment, the rear sheath waste fluid cell 50 has the sealing cover 54, but the diameter of a hole in communication with the atmosphere is appropriately increased, to adjust the magnitude of negative pressure when the waste fluid cell 70 is in communication with the rear sheath waste fluid cell 50 to discharge the waste fluid, so that during measurement, when the waste fluid is discharged by the rear sheath waste fluid cell 50, the internal pressure can be kept approximately equal to the atmospheric pressure, so that a stable sample flow is not affected during measurement by the sheath flow impedance counting cell 20.

For the sheath flow impedance particle analyzer provided in the embodiments of the present application, during the cleaning of the sheath flow impedance counting cell 20, the sample loading and even mixing of the pre-mixing cell 10 can be performed at the same time. During measurement of the sample fluid by the sheath flow impedance counting cell 20, the discharge of the waste fluid in the rear sheath waste fluid cell 50 and the sampling and preparation in the sample needle 23 can be at least partially completed within this period, so that the measurement cycle of the sheath flow impedance particle analyzer is shortened and the measurement speed is increased.

The above describes preferred implementations of the present application. It should be noted that, for a person of ordinary skill in the art, several improvements and modifications may be made without departing from the principle of the present application. These improvements and modifications are also construed as falling within the scope of protection of the present application.

What is claimed is:

1. A sheath flow impedance particle analyzer, comprising:
   a sample needle;
   a pre-mixing cell connected to the sample needle, wherein a valve is disposed between the pre-mixing cell and the sample needle;
   a sheath flow impedance counting cell comprising a front cell and a rear cell, wherein the sample needle is connected to the front cell;
   a front sheath fluid cell comprising a front sheath fluid inlet port in communication with the front cell, wherein the front sheath fluid cell supplies a front sheath fluid into the front cell through the front sheath fluid inlet port;
   a rear sheath fluid cell comprising a rear sheath fluid inlet port in communication with the rear cell, wherein the rear sheath fluid cell supplies a rear sheath fluid into the rear cell through the rear sheath fluid inlet port;
   a rear sheath waste fluid cell comprising a rear sheath waste fluid inlet port in communication with the rear cell, wherein the rear sheath waste fluid cell is configured to collect a rear sheath waste fluid generated after the sheath flow impedance counting cell measures a sample fluid; and
   a waste fluid cell, wherein the pre-mixing cell, the sample needle, the sheath flow impedance counting cell, and the rear sheath waste fluid cell are all connected to the waste fluid cell, wherein the waste fluid cell is a main negative pressure source and is configured to receive waste fluids discharged from the pre-mixing cell, the sample needle, the sheath flow impedance counting cell, and the rear sheath waste fluid cell,
   wherein the sheath flow impedance particle analyzer further comprises a first auxiliary negative pressure source, the first auxiliary negative pressure source comprises at least one low pressure port and a first connecting port, the at least one low pressure port is connected to the sample needle or the rear sheath waste fluid cell, and the first auxiliary negative pressure source is connected to the waste fluid cell by the first connecting port; and wherein a waste fluid discharged from at least one of the sample needle or the rear sheath waste fluid cell flows into the at least one low pressure port and discharges into the waste fluid cell via the first connecting port.

2. The sheath flow impedance particle analyzer according to claim 1, wherein during measurement of the sample fluid by the sheath flow impedance counting cell, at least the first auxiliary negative pressure source is used to supply negative pressure to the sample needle to enable the sample needle to prepare the sample fluid, or the first auxiliary negative pressure source is used to enable the waste fluid in the rear sheath waste fluid cell to be discharged from the rear sheath waste fluid cell.

3. The sheath flow impedance particle analyzer according to claim 1, wherein
the first auxiliary negative pressure source is a sealed buffering cell, the at least one low pressure port and the first connecting port are both provided on the buffering cell;
the buffering cell comprises a second connecting port, the second connecting port is connected to an atmosphere, and when the at least one low pressure port is closed, the second connecting port is closed, and the first connecting port is open, the waste fluid cell is in communication with the buffering cell to supply a negative pressure to the buffering cell to enable the buffering cell to form the first auxiliary pressure source.

4. The sheath flow impedance particle analyzer according to claim 3, wherein the low pressure port is connected to the rear sheath waste fluid cell, and the buffering cell is located below the rear sheath waste fluid cell.

5. The sheath flow impedance particle analyzer according to claim 4, wherein the at least one low pressure port and the second connecting port are located at an upper portion of the buffering cell, the first connecting port is located at a lower portion of the buffering cell, and a height of the at least one low pressure port is lower than a height of lowest fluid surface inside the rear sheath waste fluid cell.

6. The sheath flow impedance particle analyzer according to claim 1, wherein
the at least one low pressure port comprises a first low pressure port and a second low pressure port, the first low pressure port is connected to the sample needle, and the second low pressure port is connected to the rear sheath waste fluid cell; and
during measurement of the sample fluid by the sheath flow impedance counting cell, the first low pressure port connected to the sample needle is open so that the first auxiliary negative pressure source supplies negative pressure to the sample needle to enable the sample needle to prepare the sample fluid, and the second low pressure port connected to the rear sheath waste fluid cell is open so that the first auxiliary negative pressure source supplies negative pressure to the rear sheath waste fluid cell to enable the rear sheath waste fluid cell to discharge a waste fluid.

7. The sheath flow impedance particle analyzer according to claim 6, wherein the first auxiliary negative pressure source is a sealed buffering cell, and the first low pressure port and the second low pressure port are provided in the buffering cell;
the buffering cell further comprises a second connecting port, and the second connecting port is connected to an atmosphere; and
when the first low pressure port and the second low pressure port are closed, the second connecting port is closed, and the first connecting port is open, the waste fluid cell is in communication with the buffering cell to supply negative pressure to the buffering cell to enable the buffering cell to form the first auxiliary negative pressure source.

8. The sheath flow impedance particle analyzer according to claim 7, wherein the buffering cell is located below the rear sheath waste fluid cell, the height of the second low pressure port is lower than the height of lowest fluid surface inside the rear sheath waste fluid cell, and the waste fluid in the rear sheath waste fluid cell flows into the buffering cell by gravity.

9. The sheath flow impedance particle analyzer according to claim 7, wherein the first low pressure port, the second low pressure port and the second connecting port are located at an upper portion of the buffering cell, and the first connecting port is located at a lower portion of the buffering cell.

10. The sheath flow impedance particle analyzer according to claim 1, wherein the sheath flow impedance particle analyzer further comprises a second auxiliary negative pressure source, the first auxiliary negative pressure source is connected to the rear sheath waste fluid cell, the second auxiliary negative pressure source is connected to the sample needle, and during measurement of the sample fluid by the sheath flow impedance counting cell, the second auxiliary negative pressure source supplies negative pressure to the sample needle to enable the sample needle to prepare the sample fluid, and the first auxiliary negative pressure source supplies negative pressure to the rear sheath waste fluid cell to enable the rear sheath waste fluid cell to discharge the waste fluid, the second auxiliary pressure source is a constant displacement pump, a syringe, a fluid pump or a peristaltic pump.

11. The sheath flow impedance particle analyzer according to claim 1, wherein the rear sheath waste fluid cell further comprises a sealing cover, the rear sheath waste fluid inlet port is provided on the sealing cover, an atmosphere connecting port is further provided on the sealing cover, the rear sheath waste fluid cell is in communication with an atmosphere through the atmosphere connecting port, and the sealing cover prevents the waste fluid in the rear sheath waste fluid cell from overflowing.

12. The sheath flow impedance particle analyzer according to claim 1, wherein the rear cell is provided with a rear sheath waste fluid outlet port connected to the rear sheath waste fluid inlet port of the rear sheath waste fluid cell, and the rear sheath waste fluid cell is located below the sheath flow impedance counting cell.

13. A measurement method using a sheath flow impedance particle analyzer, comprising the following steps:
providing a sheath flow impedance particle analyzer comprising a sheath flow impedance counting cell, a front cell, a syringe, a rear sheath waste fluid cell, a first auxiliary negative pressure source, a sample needle and a waste fluid cell, wherein the first auxiliary negative pressure source comprises at least one low pressure port and a first connecting port, the at least one low pressure port is connected to the sample needle or the rear sheath waste fluid cell, and the first auxiliary negative pressure source is connected to the waste fluid cell by the first connecting port;

obtaining a sample fluid by reacting a blood sample and a reagent;

cleaning the sheath flow impedance counting cell;

transferring the sample fluid to a predetermined position;

pushing the sample fluid into the front cell of the sheath flow impedance counting cell with the syringe so that the sample fluid is surrounded by a sheath flow to enable the sheath flow impedance counting cell to measure the sample fluid; and discharging a waste fluid in at least one of the sample needle or the rear sheath waste fluid cell, wherein the waste fluid discharged from at least one of the sample needle or the rear sheath waste fluid cell flows into the at least one low pressure port and discharges into the waste fluid cell via the first connecting port;

wherein the step of transferring the sample fluid to a predetermined position or discharging a waste fluid in the rear sheath waste fluid cell is performed during measurement of the sample fluid by the sheath flow impedance counting cell.

14. The measurement method according to claim 13, wherein the measurement method further comprises pre-supplying a negative pressure in the first auxiliary negative pressure source, wherein during measurement of the sample fluid by the sheath flow impedance counting cell, at least a negative pressure is supplied to the sample needle to transfer the sample fluid to a predetermined position or a negative pressure is supplied to the rear sheath waste fluid cell to discharge the waste fluid in the rear sheath waste fluid cell by the first auxiliary negative pressure source.

15. The measurement method according to claim 14, wherein the sheath flow impedance particle analyzer further comprises a front sheath fluid cell, a rear sheath fluid cell and a rear cell, wherein measuring the sample fluid by the sheath flow impedance counting cell comprises:

feeding a sheath fluid in the front sheath fluid cell into the front cell of the sheath flow impedance counting cell, and feeding a sheath fluid in the rear sheath fluid cell into the rear cell, to prepare the sheath fluid in the front cell and the rear cell; and during a sheath fluid preparation in the front cell and the rear cell, the sample fluid in a pre-mixing cell is drawn into the sample needle through the negative pressure pre-supplied in the first auxiliary negative pressure source.

16. The measurement method according to claim 13, wherein the sheath flow impedance particle analyzer further comprises a pre-mixing cell, wherein the method further comprises during measurement of the sample fluid by the sheath flow impedance counting cell, cleaning the pre-mixing cell.

17. The measurement method according to claim 13, wherein the first auxiliary negative pressure source is a buffering cell, and the waste fluid discharged from at least one of the sample needle or the rear sheath waste fluid cell flows into the buffering cell, wherein the method further comprises during measurement of the sample fluid by the sheath flow impedance counting cell, discharging the waste fluid in the buffering cell into the waste fluid cell.

18. The measurement method according to claim 13, wherein the first auxiliary negative pressure source is a buffering cell, and the waste fluid discharged from at least one of the sample needle or the rear sheath waste fluid cell flows into the buffering cell, wherein the method further comprises during measurement of the sample fluid by the sheath flow impedance counting cell or during the cleaning of the sheath flow impedance counting cell, pre-supplying the negative pressure in the buffering cell through the waste fluid cell.

19. The measurement method according to claim 13, wherein the method further comprises during the cleaning of the sheath flow impedance counting cell, discharging the waste fluid in the rear sheath waste fluid cell.

20. The measurement method according to claim 13, wherein the method further comprises providing a second auxiliary negative pressure source to transfer the sample fluid to a predetermined position.

* * * * *